United States Patent [19]

Nohr et al.

[11] Patent Number: 4,666,452
[45] Date of Patent: May 19, 1987

[54] HYDROPHILIC SURFACE - MODIFIED POLYOLEFIN STRUCTURES

[75] Inventors: Ronald S. Nohr, Roswell, Ga.; Vincent D. McGinniss, Delaware, Ohio

[73] Assignee: Kimberly-Clark Corporation, Neenah, Wis.

[21] Appl. No.: 839,011

[22] Filed: Mar. 12, 1986

[51] Int. Cl.$^4$ .................. C08F 8/36; C08F 8/38; D06B 19/00; D06M 11/00
[52] U.S. Cl. ................ 8/115.52; 8/115.53; 8/115.54; 8/149.2; 8/DIG. 9; 264/83; 428/400; 428/409; 525/333.9; 525/344; 525/355
[58] Field of Search .......... 264/83; 525/333.9, 344, 525/355; 8/115.53, DIG. 9, 115.52, 115.54, 149.2; 428/409, 400

[56] References Cited

U.S. PATENT DOCUMENTS

| | | | |
|---|---|---|---|
| 3,624,054 | 11/1971 | Barton et al. | 525/333.9 |
| 3,765,948 | 10/1973 | Johnson | 264/48 |
| 4,000,967 | 1/1977 | Johnson et al. | 8/115.53 |
| 4,220,739 | 9/1980 | Walles | 525/344 |
| 4,452,953 | 6/1984 | Benedikt | 525/344 |
| 4,560,731 | 12/1985 | Rifi | 525/333.9 |
| 4,584,351 | 4/1986 | Blanchard | 525/344 |

FOREIGN PATENT DOCUMENTS 952111  3/1964  United Kingdom .

OTHER PUBLICATIONS

J. Mitchell, Jr. and L. R. Perkins, *Applied Polymer Symposia*, 1967, 167-173.

Primary Examiner—James C. Cannon
Attorney, Agent, or Firm—William E. Maycock

[57] ABSTRACT

A shaped polyolefin structure, such as a polyolefin fiber or a nonwoven web containing polyolefin fibers, is rendered hydrophilic by contacting the structure with a gaseous mixture of chlorine, sulfur dioxide, and oxygen or carbon monoxide or a mixture thereof, in the presence of a free radical-producing means. Such treatment results in the formation of hydrogen sulfato groups at the structure surface. Preferably, the hydrogen sulfato groups are converted to ammonium sulfato groups by subsequent treatment with ammonia or a sufficiently basic amine.

64 Claims, No Drawings

HYDROPHILIC SURFACE - MODIFIED POLYOLEFIN STRUCTURES

BACKGROUND OF THE INVENTION

The present invention relates to hydrophilic polyolefins. More particularly, the present invention relates to hydrophilic shaped polyolefin structures having surfaces modified by the presence of groups which render such surfaces hydrophilic.

As used herein, the term "shaped polyolefin structure" is used broadly to include any solid form of a polyolefin, in contrast to a polyolefin in a gaseous or liquid phase, or in solution. Thus, the polyolefin can be in particulate form, such as a powder or granules or chips, a molded article, an extruded shape, fibers, woven or nonwoven fabrics, films, or the like. For convenience, the discussion which follows will be limited to fibers and nonwoven fabrics or webs. Such discussion, however, is not to be construed as in any way limiting either the spirit or the scope of the present invention.

Polyolefin fibers presently are employed in a variety of commercial applications. For some applications, however, such as in disposable nonwoven absorbent products, the hydrophobic nature of polyolefin is a disadvantage. Even in earlier nonfiber products, there was a need for a hydrophilic polyolefin. Consequently, efforts were directed to methods of altering the hydrophobic nature of polyolefin surfaces.

One of the earliest of such methods is described in British Patent Specification No. 952,111. The patent describes a method of obtaining durable, lasting, chemically active polyolefin surfaces to which adhesives, dyes, inks, and coatings will adhere, and which surfaces also have acquired antistatic properties. In other words, the described method purportedly renders the polyolefin surfaces hydrophilic. The method involves exposing the surface of a solid polyolefin to a mixture of gaseous sulfur dioxide and chlorine in the presence of ultraviolet light to form chlorosulfo ($-SO_2Cl$) groups on such surface, allegedly leaving the bulk of the polymer unchanged. The chlorosulfo groups then are reacted with a reagent selected from the class consisting of ammonia, monoamines, polyamines, monohydric alcohols, polyhydric alcohols, alkylene oxides, and aqueous alkali metal hydroxides.

U.S. Pat. No. 3,624,054 describes the chlorosulfonation reaction of the above reference without a subsequent treatment with an amine, an epoxide, or a hydroxy-containing compound. According to the disclosure, powdered polyethylene is mixed with glass beads and treated with a gaseous mixture of sulfur dioxide and chlorine in the presence of actinic, e.g., ultraviolet, light. Care is taken to exclude all oxygen and water from the reaction vessel. The treated polyethylene is used to make nonconductive insulating coatings for electrical wiring.

U.S. Pat. Nos. 3,765,948 and 4,000,967 relate to wettable nonwoven structures such as a battery separator. Briefly, a nonwoven mat of polyolefin fiber is contacted with a gaseous mixture of sulfur dioxide and chlorine in the presence of ultraviolet radiation, followed by treatment with an amine.

These prior art chlorosulfonation reactions all are equivalent, if not identical, and introduces chlorosulfo groups on the surface of the polymer. In all but one reference, the chlorosulfo groups then are reacted with amine to give amidosulfo groups. While chlorosulfonation of the polyolefin surface undoubtedly occurs, it does not appear to occur extensively. Furthermore, the amidosulfo group, especially at relatively low concentrations, is not particularly effective in altering the hydrophobic nature of the polyolefin surface.

In addition to chlorosulfonation, such prior art procedures are believed to result in extensive chlorination. In fact, chlorination appears to be the predominant reaction. Moreover, these prior art reactions are not limited to surfaces but affect the bulk of the article being treated. Consequently, the extensive chlorination which apparently takes place can have a significant adverse effect on the physical properties of the polyolefin article, especially when fibers or nonwoven fabrics or webs are being treated.

Consequently, there is a need for a method of effectively rendering polyolefins hydrophilic which lacks or minimizes competing side reactions. There also is a need for a method of rendering the surfaces of polyolefin structures hydrophilic.

SUMMARY OF THE INVENTION

It now has been discovered that ammonium sulfato groups on the surface of a shaped polyolefin structure are highly effective in rendering such structure hydrophilic. A method of introducing hydrogen sulfato groups on the surface of the polyolefin structure also has been discovered, which groups are readily converted to ammonium sulfato groups. While not as effective as ammonium sulfato groups, the hydrogen sulfato groups are capable of imparting hydrophilic properties to the shaped polyolefin structure.

It therefore is an object of the present invention to provide a hydrophilic shaped polyolefin structure.

An additional object of the present invention is to provide a hydrophilic shaped polyolefin structure having a surface modified by the presence of hydrogen sulfato groups.

A further object of the present invention is to provide a hydrophilic shaped polyolefin structure having a surface modified by the presence of ammonium sulfato groups.

Another object of the present invention is to provide a hydrophilic shaped polyolefin structure having a surface modified by the presence of hydrogen sulfato groups, in which structure the concentration of chloro groups is sufficiently low so that the hydrophilic nature of the modified surface and the physical properties of the structure are not significantly adversely affected.

Yet another object of the present invention is to provide a hydrophilic shaped polyolefin structure having a surface modified by the presence of ammonium sulfato groups, in which structure the concentration of chloro groups is sufficiently low so that the hydrophilic nature of the modified surface and the physical properties of the structure are not significantly adversely affected.

Still another object of the present invention is to provide a hydrophilic polyolefin fiber having a surface modified by the presence of either hydrogen sulfato groups or ammonium sulfato groups.

A further object of the present invention is to provide a nonwoven web comprising hydrophilic polyolefin fibers having surfaces modified by the presence of either hydrogen sulfato groups or ammonium sulfato groups.

Another object of the present invention is to provide a method of imparting a hydrophilic character to a surface of a shaped polyolefin structure.

These and other objects will be apparent to one having ordinary skill in the art from a consideration of the specification and claims which follow.

Accordingly, the present invention provides a hydrophilic shaped polyolefin structure having a surface modified by the presence of hydrogen sulfato groups at a concentration sufficient to render such surface hydrophilic.

The present invention further provides a hydrophilic shaped polyolefin structure having a surface modified by the presence of ammonium sulfato groups at a concentration sufficient to render such surface hydrophilic.

In preferred embodiments, the polyolefin is polyethylene or polypropylene, preferably in the form of a fiber or nonwoven fabric or web.

The present invention also provides a method of imparting a hydrophilic character to a surface of a shaped polyolefin structure which comprises contacting the surface with a gaseous mixture comprising chlorine, sulfur dioxide, and oxygen or carbon monoxide or a mixture thereof in the presence of a free radical-producing means under conditions sufficient to introduce hydrogen sulfato groups at the structure surface.

The present invention further provides a method of imparting a hydrophilic character to a surface of a shaped polyolefin structure which comprises the steps of:

A. contacting the surface with a gaseous mixture comprising chlorine, sulfur dioxide, and oxygen or carbon monoxide or a mixture thereof in the presence of a free radical-producing means under conditions sufficient to introduce hydrogen sulfato groups at the structure surface; and B. converting the hydrogen sulfato groups to ammonium sulfato groups by treating the surface obtained from step A with ammonia or an amine having a sufficiently low $pK_B$ under conditions sufficient to cause such conversion.

In preferred embodiments, the chlorine to sulfur dioxide volume ratio is less than about 2.5 and the gaseous mixture contains less than about 80 percent by volume of oxygen or carbon monoxide or a mixture thereof.

It may be noted at this point that the presence of dialkyl sulfate groups on the surface of polyethylene has been reported. See J. Mitchell, Jr. and L. R. Perkins, *Applied Polymer Symposia*, 1967, 167-173. According to the authors, polyethylene oxidizes upon exposure to oxygen to give hydroperoxide groups. Upon treating the oxidized polyethylene surface with sulfur dioxide, dialkyl sulfate groups allegedly are formed. The presence of the sulfate groups was determined by measuring absorbance at 1195 $cm^{-1}$. The lower limit of hydroperoxide group detection was estimated to be about 2 ppm, although it was postulated that the use of thicker films and the absence of interference fringes would permit detection of as little as 0.1 ppm of hydroperoxide. The maximum hydroperoxide content actually measured apparently was 220 ppm or 0.214 peroxide groups per 2000 carbon atoms which corresponds to about 0.01 atom percent.

During the preliminary experiments leading to the present invention, polypropylene nonwoven fabric was exposed to a mixture of sulfur dioxide and air in the presence of ultraviolet radiation, followed by treatment with excess ammonia. The polypropylene fabric remained nonwetting. In fact, similar results were obtained when the sulfur dioxide and air mixture was replaced with (1) sulfur dioxide, (2) ammonia, (3) air, (4) sulfur dioxide and ammonia, (5) sulfur dioxide, ammonia, and air, and (6) sulfuryl chloride.

DETAILED DESCRIPTION OF THE INVENTION

As already indicated, the polyolefin structure can have any size or shape without limitation. The method of the present invention is especially useful, however, when the polyolefin structure is a fiber or an array of fibers such as a nonwoven fabric or web. As used herein, the terms "fabrics" and "web" are deemed to be synonymous and to include any nonwoven material such as meltblown and spunbonded products. Furthermore, the term "fiber" is means to include continuous filaments and noncontinuous fibers.

For the purposes of the present disclosure, the term "polyolefin" is meant to include any polymer a major constituent of which, i.e., at least 50 percent by weight, is a polyolefin. Thus, the term includes homopolymers, copolymers, and polymer blends. With respect to bi- or polycomponent structures, the major constituent requirement applies only to the component having the surface or surfaces to be treated by the method of the present invention. By way of illustration only, examples of bicomponent structures include sheath-core fibers in which the sheath is a polyolefin as defined herein, and a core of a polystyrene or polyurethane foam encased in a rigid polyolefin shell.

Examples of polyolefins include polyethylene, polystyrene, poly(vinyl chloride), poly(vinyl acetate), poly(vinylidene chloride), poly(acrylic acid), poly(methacrylic acid), poly(methyl methacrylate), poly(ethyl acrylate), polyacrylamide, polyacrylonitrile, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, and the like.

Copolymers can be random or block copolymers of two or more polyolefins (or two or more different polyolefin monomeric precursors) or of one or more polyolefins and one or more nonpolyolefin polymers. Similarly, polymer blends can utilize two or more polyolefins or one or more polyolefins and one or more nonpolyolefin polymers.

As a practical matter, homopolymers and copolymers and polymer blends involving only polyolefins are preferred, with homopolymers being more preferred. The preferred homopolymers are polyethylene and polypropylene.

In general, the concentration of hydrogen sulfato groups or ammonium sulfato groups present on the surface of the polyolefin structure is not critical, provided that such concentration is sufficient to impart the desired degree of hydrophilic character to the structure. Such a functional definition is necessary because of the difficulty in measuring the concentration of such groups and the subjective nature of hydrophilicity. Moreover, a given degree of hydrophilicity usually can be achieved with a lower concentration of ammonium sulfato groups because they are significantly more effective than hydrogen sulfato groups in imparting hydrophilic character to the shaped polyolefin structure.

Because hydrophilicity is a surface phenomenon, it is apparent that the surface of the polyolefin structure must be modified in order to alter the inherent or natural hydrophobic nature of the polymer. Unlike the prior art chlorination (and perhaps chlorosulfonation) reaction, the new reaction upon which the present invention is based appears, at least under the reaction conditions investigated, to be limited to polymer at or near the surface, i.e., to a depth of no more than about 200 Å. Such a limitation is advantageous when polymer structures, such as fibers and films, are involved which require unimpaired polymer or structure integrity. It is equally apparent, however, that modification of the polymer in areas other than the surface should be acceptable, provided that other necessary or desired characteristics of either the polymer or the structure are not significantly adversely affected.

Modification of the polymer in areas other than the structure surface may occur with appropriate changes in reaction conditions, such as increased reaction times, increased pressures of gaseous reactants, and/or increased reaction temperatures. Alternatively, the polymer could be treated in finely divided particulate form and subsequently processed to give the desired shaped structures.

Thus, the term "surface" is used broadly herein to subjectively or qualitatively distinguish the outer, surface-containing portion of the shaped polyolefin structure from the inner portion. However, such term is not intended to limit either the spirit or the scope of the present invention.

As stated earlier, a method of the present invention, which is a method of imparting a hydrophilic character to a surface of a shaped polyolefin structure, comprises the steps of:

A. contacting the surface with a gaseous mixture comprising chlorine, sulfur dioxide, and oxygen or carbon monoxide or a mixtuere thereof in the presence of a free radical-producing means under conditions sufficient to introduce hydrogen sulfato groups at the surface; and B. converting the hydrogen sulfato groups to ammonium sulfato groups by treating the surface with ammonia or an amine having a sufficiently low $pK_B$ under conditions sufficient to cause such conversion.

Because the hydrogen sulfato groups which result from step A impart hydrophilic character to the surface, step B, while preferred, is optional. Since step A is the same whether or not step B also is employed, step A will be discussed herein as though it were part of a two-step procedure, it being understood that step A alone comprises another method of the present invention.

The reaction which takes place in step A is initiated by free radicals. Consequently, a free radical-producing means must be present. As is well known to those having ordinary skill in the art, such means include thermal, photochemical, and redox methods. A photochemical method, i.e., photoinitiation, is the simplest and most practical method and, consequently, is preferred. Photoinitiation is readily accomplished by carrying out the reaction in the presence of actinic light, with ultraviolet light being preferred. While irradiation parameters are not known to be critical, satisfactory results are readily attained through the use of 275-watt General Electric sunlamps located 4 inches (10.2 cm) from the surface to be treated.

The gaseous reaction mixture employed in step A is readily characterized by the following two parameters: the chlorine to sulfur dioxide volume ratio and the percent by volume of oxygen or carbon monoxide or a mixture thereof present in the gaseous reaction mixture.

The chlorine to sulfur dioxide volume ratio desirably will be less than about 2.5. Preferably, such ratio will be less than about 1.0. Such ratio more preferably will be less than about 0.4 and most preferably will be less than about 0.1.

Preferably, the gaseous reaction mixture of step A will contain less than about 80 percent by volume of oxygen or carbon monoxide or a mixture thereof and more preferably less than about 50 percent by volume. Most preferably, the amount of oxygen or carbon monoxide or a mixture thereof present in the gaseous reaction mixture of step A will be in the range of from about 2 to about 30 percent by volume. Oxygen is the preferred component.

The gaseous reaction mixture of step A also can contain inert gases, such as nitrogen, helium, and argon, or other materials, provided such other materials do not significantly adversely affect the sulfation reaction or the properties of the shaped polyolefin structure. For example, oxygen is conveniently supplied as air. When inert gases or other materials are present in the gaseous reaction mixture, however, the levels and ranges relative thereto as described above are normalized values; i.e., values determined as though such inert gases or other materials were not pesent in the gaseous reaction mixture. Thus, when air is used to provide oxygen in the gaseous reaction mixture, such mixture preferably contains from about 10 to about 30 percent by volume of air.

In general, the reaction temperature and time are not critical. The reaction temperature can vary from about 0° C. to about 150° C.

When photoinitiation is employed as the free radical-producing means, the reaction temperature preferably will be in the range of from about 20° C. to about 100° C.; most preferably, the reaction will be carried out at ambient temperature. As used herein, however, ambient temperature does not necessarily mean room temperature. Rather, the term "ambient temperature" is used to denote the natural temperature of the shaped polyolefin structure surface and/or the gaseous reaction mixture without the deliberate application of infrared radiation having as its objective the heating of the surface and/or the gaseous reaction mixture. For example, when photoinitiation employs sunlamps, infrared radiation, as well as visible light, is produced in addition to ultraviolet radiation. Unless the output of the sunlamps is filtered, such as, for example, by an infrared-absorbing film of water, the sunlamps inevitably will heat the polyolefin surface and/or the gaseous reaction mixture. Unless the temperature of the polyolefin surface or that of the gaseous reaction mixture is monitored and deliberately maintained at a temperature higher than that of the external or room environment, the reaction, for purposes of this disclosure, is deemed to be carried out at ambient temperature.

Of course, the intentional heating of the reaction environment is possible and may in some cases be desirable or even preferred. This would be especially true if heat were selected as the free radical-producing means.

Although, as already noted, reaction times are not critical, in general shorter reaction times can be used when higher reaction temperatures are employed. At ambient temperature (as defined herein), reaction times of from about 1 to about 10 minutes are typical, although longer or shorter times can be employed, depending upon the circumstances.

In general, the reaction can be carried out at any desired pressure, although atmospheric pressure perhaps is the most practical and, therefore, is preferred. While subatmospheric pressures can be employed, they are not preferred since reaction times usually must be increased. In some situations, particularly when the shaped polyolefin structure to be treated is conveniently enclosed within a sealed vessel, superatmospheric pressures may be desirable in order to reduce the reaction time or to increase the degree of sulfation.

In step B of the method of the present invention, the hydrogen sulfato groups introduced by step A are converted to ammonium sulfato groups by treating the surface obtained from step A with ammonia or an amine having a sufficiently low $pK_B$ under conditions sufficient to cause such conversion.

As used herein, the term "ammonium" is used generically to mean any quaternary ammonium cation which, in conjunction with the sulfate anion with which it is associated, imparts the desired hydrophilic characteristic to the shaped polyolefin structure. The only known restriction with respect to the amine employed to form such ammonium cation is that it must be sufficiently basic to react with the hydrogen sulfato groups under reasonable conditions, i.e., at temperatures which do not significantly adversely affect the shaped polymer structure and for times which are not unduly long.

The simplest "amine" coming within the above description of the ammonium cation which is suitable in the present invention is, of course, ammonia. In fact, ammonia is preferred because it is easily used in the gas phase. However, step B does not have to be carried out in the gas phase, so the amine can be a liquid at standard temperature and pressure.

Consequently, the amine can be primary, secondary, or tertiary, and the substituents can be aliphatic, alicyclic, heterocyclic, or aromatic. As a practical matter, the lower aliphatic primary and seconary amines are preferred next to ammonia.

As already indicated, step B can be carried out either in the gas phase or the liquid phase. The gas phase is preferred since the same reaction vessel employed in step A can be used without modifications of any kind. When carried out in the liquid phase, liquid amines can be used neat or dissolved in a suitable solvent. Examples of suitable solvents include, among others, water, aliphatic, alicyclic, and aromatic hydrocarbons, aliphatic alcohols, lower aliphatic esters of lower aliphatic monocarboxylic acids, lower aliphatic ethers, p-dioxane, dimethyl sulfoxide, and the like.

As with step A, the reaction conditions for step B are not known to be critical. In general, the time, temperature, and pressure parameters for step A also apply to step B. Again, ambient temperature and atmospheric pressure are preferred. Reaction times typically are in the range of from about 1 to about 5 minutes, particularly when ammonia is employed as the amine.

When step B is carried out in the gas phase, subsequent treatment of the polyolefin surface typically is not required. Under some circumstances, though, such as when step B is carried out in the liquid phase, it may be desirable or necessary to rinse the polyolefin structure to remove excess amine.

The present invention is further described by the examples which follow. In the examples, all temperatures are in degrees Celsius and all gas ratios and percentages are based on volume, unless otherwise indicated. In each case, gas ratios and percentages were determined from gas partial pressures in the reaction vessel.

EXAMPLE 1

A sample of flat, untreated, white polypropylene nonwoven fabric was mounted vertically in a 4-l glass resin vessel fitted with a top having a ground glass seal. The top was fitted with a vacuum gauge, an outlet, and an inlet. The outlet was connected to a vacuum pump and the inlet was connected, via a multiport manifold, to sources of the desired gases.

Two 275-watt General Electric sunlamps were positioned outside of the resin vessel approximately 4 inches (10 cm) from the fabric sample; the lamps faced opposite sides of the sample.

The sealed resin vessel was evacuated and charged with the desired mixture at atmospheric pressure of chlorine, sulfur dioxide, and air. The fabric sample then was irradiated at ambient temperature by the sunlamps for a specified period of time (referred to hereinafter as reaction or irradiation time). The resin vessel was evacuated to remove the gaseous reaction mixture and flushed several times with nitrogen. The sample then was removed from the vessel and tested for wettability.

The wettability or hydrophilic character of the fabric sample was tested by placing a drop of water on the fabric sample and measuring the time required for complete penetration of the water drop into the fabric (referred to hereinafter as wetting time). Each sample was tested with a minimum of five drops of water placed in five different locations. Consequently, wetting times are reported as ranges when significantly different wetting times among the five or more drops of water were observed.

The reaction conditions for step A and the results obtained are summarized in Table 1. In the table under the "Wetting Time" column, the letters "NW" mean that the sample was nonwetting (i.e., the water drops remained beaded on the sample surface) and the abbreviation "Immed." means that wetting was essentially instantaneous or immediate.

TABLE 1

Summary of Reaction Conditions Involving Chlorine, Sulfur Dioxide, and Air and the Wettability Test Results

| Sample No. | Percent Cl₂ | Percent SO₂ | Percent Air | Cl₂/SO₂ Ratio | Min. Irrad. | Wetting Time |
|---|---|---|---|---|---|---|
| 30-4 | 61 | 26 | 13 | 2.35 | 1 | NW |
| 30-5 | 61 | 26 | 13 | 2.35 | 3 | 1–5 min. |
| 30-6 | 61 | 26 | 13 | 2.35 | 10 | 5 min. |
| 31-4 | 43.5 | 43.5 | 13 | 1.00 | 1 | NW |
| 31-5 | 43.5 | 43.5 | 13 | 1.00 | 3 | 5 min. |
| 31-6 | 43.5 | 43.5 | 13 | 1.00 | 10 | 1–5 min. |
| 32-4 | 22 | 65 | 13 | 0.34 | 1 | NW |
| 32-5 | 22 | 65 | 13 | 0.34 | 3 | NW |
| 32-6 | 22 | 65 | 13 | 0.34 | 10 | 10–12 min. |
| 33-4 | 4 | 83 | 13 | 0.05 | 1 | NW |
| 33-5 | 4 | 83 | 13 | 0.05 | 3 | NW |
| 33-6 | 4 | 83 | 13 | 0.05 | 10 | 10 min. |

EXAMPLE 2

The procedure of Example 1 was repeated, except that upon evacuation of the resin vessel to remove the gaseous reaction mixture, the resin vessel was charged with one atmosphere of ammonia for a period of about five minutes. The vessel again was evacuated and flushed several times with nitrogen to remove the ammonia from the resin vessel. The sample then was removed from the vessel and tested for wettability.

The reaction conditions for the first step (step A) and the results obtained are summarized in Table 2.

TABLE 2

Summary of Step A Reaction Conditions Involving Chlorine, Sulfur Dioxide, and Air, Followed by Treatment with Excess Ammonia, and the Wettability Test Results

| Sample No. | Percent Cl$_2$ | SO$_2$ | Air | Cl$_2$/SO$_2$ Ratio | Min. Irrad. | Wetting Time |
|---|---|---|---|---|---|---|
| 30-1 | 61 | 26 | 13 | 2.35 | 1 | NW |
| 30-2 | 61 | 26 | 13 | 2.35 | 3 | 5 min. |
| 30-3 | 61 | 26 | 13 | 2.35 | 10 | 1-5 min. |
| 31-1 | 43.5 | 43.5 | 13 | 1.00 | 1 | NW |
| 31-2 | 43.5 | 43.5 | 13 | 1.00 | 3 | Immed. |
| 31-3 | 43.5 | 43.5 | 13 | 1.00 | 10 | Immed. |
| 32-1 | 22 | 65 | 13 | 0.34 | 1 | 1 min. |
| 32-2 | 22 | 65 | 13 | 0.34 | 3 | Immed. |
| 32-3 | 22 | 65 | 13 | 0.34 | 10 | Immed. |
| 33-1 | 4 | 83 | 13 | 0.05 | 1 | 8 sec. |
| 33-2 | 4 | 83 | 13 | 0.05 | 3 | Immed. |
| 33-3 | 4 | 83 | 13 | 0.05 | 10 | Immed. |
| 41-1 | 22 | 65 | 13 | 0.34 | 1 | NW |
| 41-2 | 22 | 65 | 13 | 0.34 | 3 | 5 min. |
| 41-3 | 22 | 65 | 13 | 0.34 | 10 | 1-2 sec. |
| 41-4 | 18 | 57 | 25 | 0.32 | 1 | NW |
| 41-5 | 18 | 57 | 25 | 0.32 | 3 | 1-2 sec. |
| 41-6 | 18 | 57 | 25 | 0.32 | 10 | 1-2 sec. |
| 43-1 | 22 | 65 | 13 | 0.34 | 1 | 10 min. |
| 43-2 | 22 | 65 | 13 | 0.34 | 3 | 1-2 min. |
| 43-3 | 22 | 65 | 13 | 0.34 | 10 | 1-2 sec. |
| 43-4 | 18 | 57 | 25 | 0.32 | 1 | 10 min. |
| 43-5 | 18 | 57 | 25 | 0.32 | 3 | 1-2 sec. |
| 43-6 | 18 | 57 | 25 | 0.32 | 10 | Immed. |
| 52-1 | 4 | 83 | 13 | 0.05 | 1 | NW |
| 52-2 | 4 | 83 | 13 | 0.05 | 3 | Immed. |
| 52-3 | 4 | 83 | 13 | 0.05 | 10 | Immed. |
| 52-4 | 3.5 | 71.5 | 25 | 0.05 | 1 | NW |
| 52-5 | 3.5 | 71.5 | 25 | 0.05 | 3 | 1 sec. |
| 52-6 | 3.5 | 71.5 | 25 | 0.05 | 10 | Immed. |
| 52-7 | 2.5 | 47.5 | 50 | 0.05 | 1 | NW |
| 52-8 | 2.5 | 47.5 | 50 | 0.05 | 3 | Immed. |
| 52-9 | 2.5 | 47.5 | 50 | 0.05 | 10 | Immed. |
| 52-10 | 1 | 19 | 80 | 0.05 | 1 | NW |
| 52-11 | 1 | 19 | 80 | 0.05 | 3 | NW |
| 52-12 | 1 | 19 | 80 | 0.05 | 10 | 30 sec. |

EXAMPLE 3

The procedure of Example 2 was repeated, except that the air was replaced with carbon monoxide. The reaction conditions for step A and the results obtained are summarized in Table 3.

TABLE 3

Summary of Step A Reaction Conditions Involving Chlorine, Sulfur Dioxide, and Carbon Monoxide, Followed by Treatment with Excess Ammonia, and the Wettability Test Results

| Sample No. | Percent Cl$_2$ | SO$_2$ | CO | Cl$_2$/SO$_2$ Ratio | Min. Irrad. | Wetting Time |
|---|---|---|---|---|---|---|
| 54-1 | 4 | 83 | 13 | 0.05 | 1 | 1 min. |
| 54-2 | 4 | 83 | 13 | 0.05 | 3 | 1 min. |
| 54-3 | 4 | 83 | 13 | 0.05 | 10 | 30 sec. |
| 54-4 | 4 | 71 | 25 | 0.05 | 1 | NW |
| 54-5 | 4 | 71 | 25 | 0.05 | 3 | 15 min. |
| 54-6 | 4 | 71 | 25 | 0.05 | 10 | 15 min. |
| 54-7 | 2 | 48 | 50 | 0.05 | 1 | 4-5 min. |
| 54-8 | 2 | 48 | 50 | 0.05 | 3 | 15 sec. |
| 54-9 | 2 | 48 | 50 | 0.05 | 10 | 15 sec. |
| 54-10 | 1 | 19 | 80 | 0.05 | 1 | 15 min. |
| 54-11 | 1 | 19 | 80 | 0.05 | 3 | NW |
| 54-12 | 1 | 19 | 80 | 0.05 | 10 | 30 sec. |

EXAMPLE 4

In an attempt to better understand the sulfation reaction of the present invention, the chlorosulfonation reaction of the prior art was carried out by repeating the procedure of Example 1 and replacing the air with nitrogen. The reaction conditions and the results obtained are summarized in Table 4.

TABLE 4

Summary of Reaction Conditions Involving Chlorine, Sulfur Dioxide, and Nitrogen and the Wettability Test Results

| Sample No. | Percent Cl$_2$ | SO$_2$ | N$_2$ | Cl$_2$/SO$_2$ Ratio | Min. Irrad. | Wetting Time |
|---|---|---|---|---|---|---|
| 34-1 | 61 | 26 | 13 | 2.35 | 1 | NW |
| 34-2 | 61 | 26 | 13 | 2.35 | 3 | NW |
| 34-3 | 61 | 26 | 13 | 2.35 | 10 | NW |
| 35-1 | 43.5 | 43.5 | 13 | 1.00 | 1 | NW |
| 35-2 | 43.5 | 43.5 | 13 | 1.00 | 3 | NW |
| 35-3 | 43.5 | 43.5 | 13 | 1.00 | 10 | NW |
| 36-1 | 22 | 65 | 13 | 0.34 | 1 | NW |
| 36-2 | 22 | 65 | 13 | 0.34 | 3 | NW |
| 36-3 | 22 | 65 | 13 | 0.34 | 10 | NW |
| 37-1 | 4 | 83 | 13 | 0.05 | 1 | NW |
| 37-2 | 4 | 83 | 13 | 0.05 | 3 | NW |
| 37-3 | 4 | 83 | 13 | 0.05 | 10 | NW |

EXAMPLE 5

The procedure of Example 2 was repeated, except that the air in the first step was replaced with nitrogen. The reaction conditions for the first step and the results obtained are summarized in Table 5.

TABLE 5

Summary of First Step Reaction Conditions Involving Chlorine, Sulfur Dioxide, and Nitrogen, Followed by Treatment with Excess Ammonia, and the Wettability Test Results

| Sample No. | Percent Cl$_2$ | SO$_2$ | N$_2$ | Cl$_2$/SO$_2$ Ratio | Min. Irrad. | Wetting Time |
|---|---|---|---|---|---|---|
| 26-1 | 22 | 65 | 13 | 0.34 | 1 | NW |
| 26-2 | 22 | 65 | 13 | 0.34 | 3 | NW |
| 26-3 | 22 | 65 | 13 | 0.34 | 10 | NW |
| 27-1 | 43.5 | 43.5 | 13 | 1.00 | 1 | NW |
| 27-2 | 43.5 | 43.5 | 13 | 1.00 | 3 | NW |
| 27-3 | 43.5 | 43.5 | 13 | 1.00 | 10 | NW |
| 28-1 | 61 | 26 | 13 | 2.35 | 1 | NW |
| 28-2 | 61 | 26 | 13 | 2.35 | 3 | NW |
| 28-3 | 61 | 26 | 13 | 2.35 | 10 | NW |
| 29-1 | 4 | 83 | 13 | 0.05 | 1 | 10 sec. |
| 29-2 | 4 | 83 | 13 | 0.05 | 3 | 15 sec. |
| 29-3 | 4 | 83 | 13 | 0.05 | 10 | 10-20 sec. |
| 44-1 | 22 | 65 | 13 | 0.34 | 1 | 10 min. |
| 44-2 | 22 | 65 | 13 | 0.34 | 3 | 5 min. |
| 44-3 | 22 | 65 | 13 | 0.34 | 10 | 1-15 sec. |
| 44-4 | 18 | 57 | 25 | 0.32 | 1 | 10 min. |
| 44-5 | 18 | 57 | 25 | 0.32 | 3 | 5-10 min. |
| 44-6 | 18 | 57 | 25 | 0.32 | 10 | 1 sec.-2 min. |
| 51-1 | 4 | 83 | 13 | 0.05 | 1 | NW |
| 51-2 | 4 | 83 | 13 | 0.05 | 3 | 1-2 min. |
| 51-3 | 4 | 83 | 13 | 0.05 | 10 | 15 sec. |
| 51-4 | 3.5 | 71.5 | 25 | 0.05 | 1 | NW |
| 51-5 | 3.5 | 71.5 | 25 | 0.05 | 3 | NW |
| 51-6 | 3.5 | 71.5 | 25 | 0.05 | 10 | 2-3 min. |
| 51-7 | 2.5 | 47.5 | 50 | 0.05 | 1 | NW |
| 51-8 | 2.5 | 47.5 | 50 | 0.05 | 3 | 15 min. |
| 51-9 | 2.5 | 47.5 | 50 | 0.05 | 10 | 15 min. |
| 51-10 | 1 | 19 | 80 | 0.05 | 1 | NW |
| 51-11 | 1 | 19 | 80 | 0.05 | 3 | NW |
| 51-12 | 1 | 19 | 80 | 0.05 | 10 | 1-2 min. |

From the data in Tables 1-5, inclusive, it is clear that the methods of the present invention are far superior to those of the prior art in imparting a hydrophilic character to a surface of a shaped polyolefin structure. This conclusion is shown more dramatically by Tables 6 and 7 in which a side-by-side comparison of experiments is made, the only difference between experiments on a given line being the presence or absence of air (i.e., air versus nitrogen). Table 6 compares experiments involving only the first step, which is the reaction of a polypropylene nonwoven fabric with a gaseous mixture of either chlorine, sulfur dioxide, and air or chlorine, sulfur dioxide, and nitrogen. Table 7 compares experiments in which the first step was followed by treatment of the fabric with excess ammonia.

TABLE 6

Comparison of Wettability Test Results of Experiments Involving the Reaction Employing Chlorine, Sulfur Dioxide, and Either Air or Nitrogen

| Sample No. | | Wetting Time | |
|---|---|---|---|
| Air | Nitrogen | Air | Nitrogen |
| 30-4 | 34-1 | NW | NW |
| 30-5 | 34-2 | 1–5 min. | NW |
| 30-6 | 34-3 | 5 min. | NW |
| 31-4 | 35-1 | NW | NW |
| 31-5 | 35-2 | 5 min. | NW |
| 31-6 | 35-3 | 1–5 min. | NW |
| 32-4 | 36-1 | NW | NW |
| 32-5 | 36-2 | NW | NW |
| 32-6 | 36-3 | 10–12 min. | NW |
| 33-4 | 37-1 | NW | NW |
| 33-5 | 37-2 | NW | NW |
| 33-6 | 37-3 | 10 min. | NW |

TABLE 7

Comparison of Wettability Test Results of Experiments Involving the Reaction Employing Chlorine, Sulfur Dioxide, and Either Air or Nitrogen, Followed by Treatment with Excess Ammonia

| Sample No. | | Wetting Time | |
|---|---|---|---|
| Air | Nitrogen | Air | Nitrogen |
| 30-1 | 28-1 | NW | NW |
| 30-2 | 28-2 | 5 min. | NW |
| 30-3 | 28-3 | 1–5 min. | NW |
| 31-1 | 27-1 | NW | NW |
| 31-2 | 27-2 | Immed. | NW |
| 31-3 | 27-3 | Immed. | NW |
| 32-1 | 26-1 | 1 min. | NW |
| 32-2 | 26-2 | Immed. | NW |
| 32-2 | 26-3 | Immed. | NW |
| 33-1 | 29-1 | 8 sec. | 10 sec. |
| 33-2 | 29-2 | Immed. | 15 sec. |
| 33-3 | 29-3 | Immed. | 10–20 sec. |
| 41-1, 43-1 | 44-1 | NW, 10 min. | 10 min. |
| 41-2, 43-2 | 44-2 | 5 min., 1–2 min. | 5 min. |
| 41-3, 43-3 | 44-3 | 1–2 sec., 1–2 sec. | 1–15 sec. |
| 41-4, 43-4 | 44-4 | NW, 10 min. | 10 min. |
| 41-5, 43-5 | 44-5 | 1–2 sec., 1–2 sec. | 5–10 min. |
| 41-6, 43-6 | 44-6 | 1–2 sec., Immed. | 1 sec.–2 min. |
| 52-1 | 51-1 | NW | NW |
| 52-2 | 51-2 | Immed. | 1–2 min. |
| 52-3 | 51-3 | Immed. | 15 sec. |
| 52-4 | 51-4 | NW | NW |
| 52-5 | 51-5 | 1 sec. | NW |
| 52-6 | 51-6 | Immed. | 2–3 min. |
| 52-7 | 51-7 | NW | NW |
| 52-8 | 51-8 | Immed. | 15 min. |
| 52-9 | 51-9 | Immed. | 15 min. |
| 52-10 | 51-10 | NW | NW |
| 52-11 | 51-11 | NW | NW |
| 52-12 | 51-12 | 30 sec. | 1–2 min. |

Analytical Studies

Sample No. 32-3 from Example 2 was analyzed by reflectance infrared spectroscopy. From Table 2, it is seen that Sample No. 32-3 resulted from treatment with chlorine, sulfur dioxide, and air, followed by treatment with excess ammonia, to give an immediately wettable surface. The results of the infrared analysis are summarized in Table 8.

TABLE 8

Summary of Infrared Analysis of Sample No. 32-3

| Observed Maxima | | Known Maxima of Ammonium Alkyl Sulfates[a] | | |
|---|---|---|---|---|
| Freq.[b] | Intens. | Freq.[b] | Intens. | Functionality |
| 3500 | s(b)[c] | | | |
| 3300 | m(sh) | 3335–3030 | vs | Ammonium ion |
| 3050 | w | | | |
| 2960 | m | | | |
| 2930 | s | | | |
| 2860 | s | | | |
| 1640 | w | | | |
| 1500 | s | | | |
| 1465 | m | | | |
| 1420 | w | | | |
| 1380 | m | 1485–1340 | s | Ammonium ion |
| | | 1315–1220 | vs | Asym. $SO_2$ stretch[d] |
| 1230 | s(b) | 1270–1210 | vs | Asym. $SO_2$ stretch[e] |
| 1060 | m | 1075–1050 | s | Sym. $SO_2$ stretch[e] |
| 1010 | m | N1000 | | Primary alkyl-sulfate salts |
| 955 | m | 945–925 | m | Secondary alkyl sulfate salts |
| 850 | w(b) | 840–835 | m | S—O—C stretch[d] |
| 740 | m | | | |
| 610 | w | 700–570 | m–s | $SO_3$ bending (two bands)[d,e] |
| 590 | w | | | |
| 460 | w | | | |
| 430 | w | 440–410 | w | $SO_3$ rocking |

[a]From G. Socrates, "Infrared Characteristic Group Frequencies", John Wiley & Sons, New York, 1980, pp. 115–6, 140, and 145.
[b]Frequency, cm$^{-1}$
[c]Abbreviations: vs, very strong; s, strong; m, medium; w, weak; b, broad; and sh, shoulder.
[d]Primary alkyl sulfate salts.
[e]Secondary alkyl sulfate salts.

The data of Table 8 clearly indicate the presence of surface ammonium sulfato groups which may be primary, secondary, or both.

Five samples were subjected to electron spectroscopy for chemical analysis (ESCA). In addition, high resolution ESCA spectra were taken over the signal ranges for the elements of interest. Two samples were analyzed twice on separate occasions; the second analysis is identified by the designation "B" following the sample number.

All ESCA data were collected by Surface Science Laboratories, Inc., Mountain View, Calif., using a Hewlett Packard 5950 B spectrometer with a monochromatic aluminum K-alpha x-ray source. The survey scans were done with the open aperture setting for high sensitivity (low resolution). The x-ray power setting was either 600 or 800 watts and charge neutralization was accomplished with a flood gun setting of 13 electron volts. The vacuum utilized was $10^{-8}$ Torr. The high resolution data employed the closed aperture setting, with the spectrometer resolution approaching 0.8 electron volts. The area analyzed was about $1 \times 4$ mm and the sampling depth was about 100 Å.

For convenience, the characteristics of the five samples are summarized in Table 9.

TABLE 9

Characteristics of Samples Subjected to ESCA Analysis

| Sample No. | $Cl_2/SO_2$ Ratio | % Air | % $N_2$ | Min. Irrad. | Wetting Time |
|---|---|---|---|---|---|
| 31-2 | 1.00 | 13 | — | 3 | Immed. |
| 32-3 | 0.34 | 13 | — | 10 | Immed. |
| 43-6 | 0.32 | 25 | — | 10 | Immed. |

TABLE 9-continued

Characteristics of Samples Subjected to ESCA Analysis

| Sample No. | $Cl_2/SO_2$ Ratio | % Air | % $N_2$ | Min. Irrad. | Wetting Time |
|---|---|---|---|---|---|
| 44-3 | 0.34 | — | 13 | 10 | 1-15 sec. |
| 44-6 | 0.32 | — | 25 | 10 | 1 sec.-2 min. |

The high resolution spectra data are summarized in Table 10. The elemental compositions of the sample surfaces were estimated from the survey spectra and are reported in Table 11.

TABLE 10

Binding Energies (in eV) from High Resolution ESCA Spectra, Corrected to the C(1s) Signal at 284.6 eV[a]

| Sample | C(1s) | | | S(2p) | Cl(2p) | N(1s) | |
|---|---|---|---|---|---|---|---|
| No. | C1 | C2 | C3 | | | N1 | N2 |
| 31-2 | 284.6 | 286.0 | 287.4 | 168.7 | 200.3 | 399.9 | 402.0 |
| 32-3 | 284.6 | 286.1 | 287.5 | 168.7 | 200.3 | 399.7 | 401.7 |
| 32-3B | N/R[b] | N/R | N/R | N/R | N/R | N/R | N/R |
| 43-6 | 284.6 | 286.3 | 287.9 | 168.7 | 200.1 | 399.4 | 401.6 |
| 43-6B | N/R | N/R | N/R | N/R | N/R | N/R | N/R |
| 44-3 | 284.6 | 286.2 | 287.8 | 169.0 | 200.4 | 400.0 | 402.1 |
| 44-6 | 284.6 | 286.5 | — | 168.3 | 199.7 | — | — |

[a]The bonds most likely represented by the reported binding energies are as follows: C1: C—C, C—S; C2: C—O, C—CX; C3: C=O, $CO_2$; S: C—O—$SO_3^-$; Cl: C—Cl; N1: $NR_3$; and N2: $+NR_4$.
[b]N/R: Not reported by Surface Science Laboratories, Inc.

TABLE 11

Elemental Composition of the Sample Surface as Estimated from ESCA Survey Spectra

| Sample | Element[a] | | | | | Cl/S |
|---|---|---|---|---|---|---|
| No. | C | O | Cl | S | N | Ratio |
| 31-2 | 51 | 20 | 14 | 5.4 | 8.7 | 2.6 |
| 32-3 | 44 | 26 | 14 | 7.1 | 9.1 | 2.0 |
| 32-3B | 58 | 19 | 11 | 5.9 | 7.0 | 1.9 |
| 43-6 | 45 | 25 | 15 | 6.0 | 8.9 | 2.5 |
| 43-6B[b] | 53 | 22 | 6.8 | 4.8 | 6.6 | 1.4 |
| 44-3 | 44 | 13 | 32 | 3.9 | 4.7 | 8.2 |
| 44-6 | 43 | 17 | 30 | 4.4 | 5.7 | 6.8 |

[a]Reported as atom percent (may not total 100 because of rounding off).
[b]Sample apparently contained 6.6 atom percent silicon on the surface.

For the three samples exposed to a mixture of chlorine, sulfur dioxide, and air, the ESCA data indicate the presence of ammonium sulfato groups on the surface. Curiously, such groups also appear to be present on the surfaces of the two samples exposed to a mixture of chlorine, sulfur dioxide, and nitrogen, although at somewhat lower concentrations and with three- to four-fold higher chlorine to sulfur ratios. Such higher ratios support the belief, expressed earlier, that the reaction involving only chlorine and sulfur dioxide (in the presence of nitrogen) leads to extensive chlorination.

Based on the assumption that the foregoing anomalous results were caused by the presence of extraneous oxygen, the experiments described in Example 6 were carried out.

EXAMPLE 6

The procedure of Example 2 was repeated, except that after the fabric sample was mounted in the resin vessel, the vessel was purged six times with argon by repeatedly evacuating the vessel and charging it to approximately atmospheric pressure with argon, and the gaseous reaction mixture employed in the first step consisted of argon, chlorine, and, optionally, sulfur dioxide.

The reaction conditions for the first step and the results obtained are summarized in Table 12. In the table, the letters "NT" indicate that wettability was not tested.

TABLE 12

Summary of First Step Reaction Conditions Involving Argon, Chlorine, and, Optionally, Sulfur Dioxide, Followed by Treatment with Excess Ammonia, and Wettability Test Results

| Sample | Percent | | | $Cl_2/SO_2$ | Min. | Wetting |
|---|---|---|---|---|---|---|
| No. | $Cl_2$ | $SO_2$ | Argon | Ratio | Irrad. | Time |
| 76-1 | 18 | 57 | 25 | 0.32 | 10 | 3-5 min. |
| 76-2 | 18 | 57 | 25 | 0.32 | 10 | NT[a] |
| 77-1[b] | 7 | 90 | 3 | 0.08 | 10 | Immed. |
| 77-2 | 7 | 90 | 3 | 0.08 | 10 | Immed. |
| 78-1 | 5 | — | 95 | — | 5 | NW |
| 78-2 | 5 | — | 95 | — | 2 | NW |
| 79-1 | 7 | 90 | 3 | 0.08 | 10 | NT[a] |
| 80-1 | 7 | 90 | 3 | 0.08 | 10 | NT[a] |

[a]The fabric sample was not tested, but quickly transferred to an argon-filled bag.
[b]There may have been a valve leak during the first step which admitted oxygen (air) to the resin vessel.

ESCA studies were carried out on five of the foregoing eight samples and two model compounds, lithium dodecyl sulfate and sodium 1-hexadecanesulfonate (Catalog Nos. 86,190-1 and 10,641-0, respectively, Aldrich Chemical Company, Inc., Milwaukee, Wis. 53233). The results are summarized in Tables 13-15, inclusive.

TABLE 13

Binding Energies (in eV) from High Resolution ESCA Spectra, Corrected to the C(1s) Signal at 284.6 eV[a]

| Sample | C(1s) | | | | |
|---|---|---|---|---|---|
| No. | C1 | C2 | C3 | C4 | F |
| 76-1 | 284.6 | 286.0 | 287.5 | — | 689.0 |
| 76-2 | 284.6 | 285.9 | 287.6 | — | — |
| 77-1 | 284.6 | 286.0 | 287.5 | 289.1 | 687.9 |
| 77-2 | 284.6 | 286.0 | 287.8 | — | — |
| 78-1 | 284.6 | 286.2 | 287.8 | — | — |
| MC-1[b] | 284.6 | 286.3 | — | — | — |
| MC-2[c] | 284.6 | — | — | — | — |

[a]The bonds most likely represented by the reported binding energies are as follows: C1: C—C, C—H; C2: C—OR, C—Cl; C3: C=O, $CO_2$, $CCl_2$; C4: carboxyl; F: organic.
[b]Model Compound 1: Lithium dodecyl sulfate
[c]Model Compound 2: Sodium 1-hexadecanesulfonate

TABLE 14

Binding Energies (in eV) from High Resolution ESCA Spectra, Corrected to the C(1s) Signal at 284.6 eV[a]

| Sample | O1 | S1 | S2 | N(1s) | | Cl |
|---|---|---|---|---|---|---|
| No. | | | | N1 | N2 | |
| 76-1 | 532.3 | — | 169.2 | 400.1 | 402.8 | 200.6 |
| 76-2 | 532.3 | — | 169.1 | 400.1 | 402.1 | 200.6 |
| 77-1 | 532.0 | — | 168.7 | 400.0 | 402.5 | 200.4 |
| 77-2 | 532.0 | — | 168.7 | 399.8 | 401.9 | 200.3 |
| 78-1 | 532.5 | — | — | — | — | 200.8 |
| MC-1 | 532.3 | — | 168.9 | — | — | — |
| MC-2 | 531.4 | 167.7 | — | — | — | — |

[a]The bonds most likely represented by the reported binding energies are as follows: O1: C—O, carboxyl; S1: C—$SO_3^-$; S2: C—O—$SO_3^-$; N1: organic; N2: $+NR_4$; Cl: organic.

TABLE 15

| | Elemental Composition of the Sample Surface As Estimated from ESCA Survey Spectra | | | | | | | | | |
|---|---|---|---|---|---|---|---|---|---|---|
| | Element[a] | | | | | | | | | Cl/S |
| Sample No. | C | O | Si | S | Cl | N | Na | F | Li | Ratio |
| 76-1 | 49 | 11 | 0.5 | 3.6 | 31 | 3.6 | 0.3 | 0.7 | — | 8.6 |
| 76-2 | 41 | 20 | 0.5[b] | 5.7 | 26 | 6.9 | 0.3 | — | — | 4.6 |
| 77-1 | 42 | 15 | — | 4.5 | 32 | 5.1 | — | 0.9 | — | 7.1 |
| 77-2 | 42 | 16 | — | 5.6 | 29 | 7.3 | — | — | — | 5.2 |
| 78-1 | 55 | 2.5 | — | — | 43 | — | — | — | — | — |
| MC-1 | 68 | 20 | — | 5.0 | — | — | — | — | 6.5 | — |
| | (67[c]) | (22) | | (5.6) | | | | | (5.6) | |
| MC-2 | 78 | 13 | — | 4.2 | — | — | 3.9 | — | — | — |
| | (76) | (14) | | (4.8) | | | (4.8) | | | |

[a]Reported as atom percent (may not total 100 because of rounding off).
[b]A weak signal possibly was present but was close to the detection limit.
[c]Numbers in parentheses represent the theoretical values.

The N(1s) ESCA data from Example 6 indicate that both amidosulfo groups and ammonium sulfato groups are present, with the former groups predominating. However, in the absence of oxygen, the latter groups should not be formed. On the other hand, the S(2p) data support the presence of only the latter groups, based on the binding energies observed with the two model compounds. Thus, the ESCA data apparently are both internally inconsistent and inconsistent with the expected chemical phenomenon. However, relatively high chlorine to sulfur ratios are present which again suggest that extensive chlorination has taken place.

Two of the remaining samples from Example 6 were submitted for ESCA. The results are summarized in Tables 16 and 17.

TABLE 16

| | Binding Energies (in eV) from High Resolution ESCA Spectra, Corrected to the C(1s) Signal at 284.6 eV[a] | | | | | | | |
|---|---|---|---|---|---|---|---|---|
| Sample | C(1s) | | | | S2 | Cl | N(1s) | |
| No. | C1 | C2 | C3 | O1 | | | N1 | N2 |
| 79-1 | 284.6 | 286.0 | 287.8 | 532.0 | 168.6 | 200.5 | 400.0 | 402.0 |
| 80-1 | 284.6 | 286.1 | 287.9 | 532.3 | 168.9 | 200.7 | 400.1 | 402.0 |

[a]The bands most likely represented by the reported binding energies are as follows: C1: C—C, C—S; C2: C—O, C—Cl; C3: CCl₂; O1: carboxy; S2: —SO₃, —SO₄; Cl: C—Cl; N1: NR₃, where R is H or C; N2: +NR₄.

TABLE 17

| | Elemental Composition of the Sample Surface As Estimated from ESCA Survey Spectra | | | | | |
|---|---|---|---|---|---|---|
| Sample | Element[a] | | | | | Cl/S |
| No. | C | O | S | Cl | N | Ratio |
| 79-1 | 45 | 17 | 4.1 | 28 | 6.3 | 6.8 |
| 80-1 | 43 | 18 | 4.6 | 28 | 6.6 | 6.1 |

[a]Reported as atom percent (may not total 100 because of rounding off).

The same two inconsistencies appear to be present in the above ESCA data, although the ESCA data for all seven examples follow similar patterns.

In view of the results of Example 6, the presence of extraneous oxygen does not appear to be the cause of the inconsistencies presented by the ESCA data. Such inconsistencies, however, can be explained, at least in part, by the presence of inorganic ammonium salts, such as ammonium chloride and ammonium sulfate, on sample surfaces. While ESCA cannot distinguish between such salts and organic ammonium compounds, it should be possible to remove the inorganic salts from sample surfaces by washing the surfaces with water.

To test this theory, six samples previously studied by ESCA were washed with deionized water and identified by the suffix "W". ESCA studies then were carried out on the washed samples. One sample was washed a second time, identified by the suffix "W2", and reexamined by ESCA. In addition, a third model compound, N-dodecylmethanesulfonamide (Catalog No. S55373-5, Aldrich Chemical Company, Inc., Milwaukee, Wis. 53233), was submitted for ESCA. The resulting ESCA data are summarized in Tables 18-20, inclusive.

TABLE 18

| | Binding Energies (in eV) from High Resolution ESCA Spectra, Corrected to the C(1s) Signal at 284.6 eV | | | | | |
|---|---|---|---|---|---|---|
| Sample | C(1s) | | | | S2 | Cl |
| No. | C1 | C2 | C3 | C4 | | |
| 31-2W | 284.6 | 286.1 | 287.6 | — | 168.4 | 200.5 |
| 76-1W | 284.6 | 286.3 | 287.9 | — | 168.4 | 200.4 |
| 76-2W | 284.6 | 286.2 | 287.9 | — | 168.6 | 200.6 |
| 76-2W2 | 284.6 | 286.2 | 287.7 | — | 168.7 | 200.5 |
| 77-1W | 284.6 | 286.2 | 287.8 | — | 168.4 | 200.6 |
| 77-2W | 284.6 | 286.2 | 287.7 | — | 168.6 | 200.5 |
| 78-1W | 284.6 | 286.3 | 287.9 | — | — | 200.3 |
| MC-3[a] | 284.6 | 286.2 | — | 288.5[b] | 168.1 | — |

[a]Model Compound 3: N—dodecylmethanesulfonamide.
[b]The bond represented by this binding energy, present at a level of about 4.8 atom percent, must be the result of impurities.

TABLE 19

| | Binding Energies (in eV) from High Resolution ESCA Spectra, Corrected to the C(1s) Signal at 284.6 eV | | | | | |
|---|---|---|---|---|---|---|
| Sample | Si(2p)[a] | | N(1s) | | | |
| No. | Si1 | Si2 | N1 | N2 | O1 | F |
| 31-2W | 101.9 | 103.5 | 400.6 | — | 532.2 | 689.3 |
| 76-1W | 101.7 | 103.3 | 399.7 | — | 532.2 | — |
| 76-2W | 101.9 | 103.8 | 400.1 | 402.2 | 532.4 | 689.0 |
| 76-2W2 | 101.8 | 104.0 | 400.0 | — | 532.2 | — |
| 77-1W | 102.0 | 103.9 | 400.0 | — | 532.5 | — |
| 77-2W | 102.0 | 103.9 | 400.0 | — | 532.5 | 689.4 |
| 78-1W | 101.7 | 103.5 | — | — | 532.1 | — |
| MC-3 | — | — | 399.4 | — | 531.9 533.4[b] | — |

[a]The bonds most likely represented by the reported binding energies are as follows: Si1: silicate; Si2: SiO₂.
[b]This energy value apparently resulted from the presence of impurities and represents about one-third of the total oxygen present in the sample.

TABLE 20

| | Elemental Composition of the Sample Surface As Estimated from ESCA Survey Spectra | | | | | | | | | |
|---|---|---|---|---|---|---|---|---|---|---|
| Sample | Elements | | | | | | | | | |
| No. | Si | S | Cl | C | Mg | N | O | F | Zn | Na |
| 31-2W | 3.0 | 1.7 | 10 | 63 | 2.8 | 2.7 | 17 | 0.3 | — | — |
| 76-1W | 3.4 | 1.8 | 23 | 51 | 1.4 | 2.2 | 16 | — | — | — |
| 76-2W | 4.2 | 2.7 | 19 | 47 | 2.5 | 4.0 | 20 | — | 0.2 | — |
| 76-2W2 | 4.0 | 2.1 | 18 | 52 | 2.9 | 3.3 | 18 | — | — | — |

TABLE 20-continued

Elemental Composition of the Sample Surface
As Estimated from ESCA Survey Spectra

| Sample | Elements | | | | | | | | | |
|---|---|---|---|---|---|---|---|---|---|---|
| No. | Si | S | Cl | C | Mg | N | O | F | Zn | Na |
| 77-1W | 6.9 | 1.2 | 12 | 50 | 5.6 | 1.8 | 22 | — | 0.2 | — |
| 77-2W | 5.6 | 2.7 | 14 | 49 | 4.0 | 2.7 | 21 | 0.9 | — | — |
| 78-2W | 4.8 | — | 23 | 52 | 4.6 | — | 15 | — | 0.4 | — |
| MC-3 | 0.4 | 2.8 | — | 82 | — | 4.4 | 10 | — | — | 0.2 |
| | | (6.3)[a] | | (81) | | (6.3) | (6.3) | | | |

[a]Numbers in parentheses represent the theoretical values.

For convenience, the elemental compositions of the unwashed and washed samples are compared in Table 21.

TABLE 21

Comparison of Elemental Compositions of
Unwashed and Washed Sample Surfaces
As Estimated from ESCA Survey Spectra

| Sample | Element | | | | | Cl/S |
|---|---|---|---|---|---|---|
| No. | C | O | Cl | S | N | Ratio |
| 31-2 | 51 | 20 | 14 | 5.4 | 8.7 | 2.6 |
| 31-2W | 63 | 17 | 10 | 1.7 | 2.7 | 5.9 |
| 76-1 | 49 | 11 | 31 | 3.6 | 3.6 | 8.6 |
| 76-1W | 51 | 16 | 23 | 1.8 | 2.2 | 12.8 |
| 76-2 | 41 | 20 | 26 | 5.7 | 6.9 | 4.6 |
| 76-2W | 47 | 20 | 19 | 2.7 | 4.0 | 7.0 |
| 76-2W2 | 52 | 18 | 18 | 2.1 | 3.3 | 8.6 |
| 77-1 | 42 | 15 | 32 | 4.5 | 5.1 | 7.1 |
| 77-1W | 50 | 22 | 12 | 1.2 | 1.8 | 10.0 |
| 77-2 | 42 | 16 | 29 | 5.6 | 7.3 | 5.2 |
| 77-2W | 49 | 21 | 14 | 2.7 | 2.7 | 5.2 |
| 78-1 | 55 | 25 | 43 | — | — | — |
| 78-1W | 52 | 15 | 23 | — | — | — |

Finally, every washed nonwoven fabric sample was tested for wettability as described hereinbefore. Sample 31-2W wet immediately, while all of the other samples were nonwetting.

The above data clearly establish that inorganic ammonium salts, probably a mixture of ammonium chloride and ammonium sulfate, are present on the sample surfaces and that the wettability of the samples treated with chlorine and sulfur dioxide in the absence of air (oxygen) was due to the presence of such inorganic salts.

In addition, it is apparent that ESCA cannot distinguish between sulfonamide and sulfate groups. This is more readily seen by examining Table 22 which summarizes the S(2p) binding energy values for all of the samples analyzed, as well as such values for the first and third model compounds.

TABLE 22

S(2p) Binding Energy Values from High
Resolution ESCA Spectra, Where First
Step Reaction Conditions Involved Chlorine,
Sulfur Dioxide, and Air or Nitrogen or
Argon, Followed by Treatment with Excess Ammonia

| Sample | S(2p) Binding Energy Value (in eV) | | | | |
|---|---|---|---|---|---|
| No. | Air | Nitrogen | Argon | —$SO_2NR_2$ | —$SO_4^-$ |
| 31-2 | 168.7 | — | — | — | — |
| 31-2W | 168.4 | — | — | — | — |
| 32-3 | 168.7 | — | — | — | — |
| 43-6 | 168.7 | — | — | — | — |
| 44-3 | — | 169.0 | — | — | — |
| 44-6 | — | 168.3 | — | — | — |
| 76-1 | — | — | 169.2 | — | — |
| 76-1W | — | — | 168.4 | — | — |
| 76-2 | — | — | 169.1 | — | — |
| 76-2W | — | — | 168.6 | — | — |
| 76-2W2 | — | — | 168.7 | — | — |

TABLE 22-continued

S(2p) Binding Energy Values from High
Resolution ESCA Spectra, Where First
Step Reaction Conditions Involved Chlorine,
Sulfur Dioxide, and Air or Nitrogen or
Argon, Followed by Treatment with Excess Ammonia

| Sample | S(2p) Binding Energy Value (in eV) | | | | |
|---|---|---|---|---|---|
| No. | Air | Nitrogen | Argon | —$SO_2NR_2$ | —$SO_4^-$ |
| 77-1 | — | — | 168.7 | — | — |
| 77-1W | — | — | 168.4 | — | — |
| 77-2 | — | — | 168.7 | — | — |
| 77-2W | — | — | 168.6 | — | — |
| 79-1 | — | — | 168.6 | — | — |
| 80-1 | — | — | 168.9 | — | — |
| MC-1 | — | — | — | — | 168.9 |
| MC-3 | — | — | — | 168.1 | — |

This conclusion is supported by several facts. First, the difference between the binding energy values of the two model compounds is only 0.8 eV. As pointed out earlier, the resolution of the spectrometer probably is no better than about 0.8 eV.

Second, the range of binding energy values for samples treated in the presence of air is 168.4 to 168.7 eV. The range for samples treated in the absence of air is 168.3 to 169.2 eV. For all practical purposes, the ranges are the same.

Third, the presence of the inorganic ammonium salts causes a slight increase in the observed binding energy values. Stated differently, removal of such salts resulted in a 0.1 to 0.8 eV decrease in the observed binding energy values. The binding energy values of all washed samples were within the range of from 168.4 to 168.7 eV.

The foregoing analytical data and wettability test results are consistent with the presence on the shaped polyolefin structure surface of hydrogen sulfato or ammonium sulfato groups. Moreover, the analytical data were useful in interpreting the results of the preliminary experiments described earlier, as noted below.

Polypropylene nonwoven fabric was treated essentially as described in Example 5 for Sample No. 27-3. Treated fabric samples then were dyed with commercially available Rit ® dyes in accordance with the packaged instructions. The dyed samples were embedded in paraffin and cross-sections taken with a microtome. The cross-sections were examined under a polarizing light microscope. Every fiber was dyed uniformly throughout its cross-section.

The above procedure was repeated with fabrics which had been treated essentially as described in Example 2; the volume percentages of chlorine, sulfur dioxide, and air were either 13 percent, 47 percent, and 40 percent, respectively, or 7 percent, 20 percent, and 73 percent, respectively. This time, the microscopic examination showed that only the approximately outer one-third of each fiber was dyed.

Two other polypropylene nonwoven fabrics also were treated essentially as described in Example 5, with the first step gaseous reaction mixtures having the following compositions:

| Sample | Percent | | | $Cl_2/SO_2$ |
|---|---|---|---|---|
| No. | $Cl_2$ | $SO_2$ | $N_2$ | Ratio |
| EB32-1 | 20 | 60 | 20 | 0.33 |
| EB38-1 | 8 | 72 | 20 | 0.11 |

In each case, the first step reaction time was five minutes and exposure to excess ammonia was for 15 minutes. In the case of Sample No. EB38-1, it was discovered that air had leaked into the reaction vessel during the first step; air was estimated to be present at a level of about 13 percent by volume.

Both of the above samples were submitted for analysis by Rutherford back scattering (RBS) spectrometry. The analyses were carried out by Charles Evans & Associates, Redwood City, Calif. The apparatus employed was a General Ionics Model 4110 Tandem Accelerator (General Ionics Corporation, Newburyport, Mass.) using an Evens End Station (Charles Evans & Associates). A 2.275 MeV He$^{++}$ probe ion was used, with a detection angle of 165°. Typical beam currents were 1-20 nanoamps. Ions were detected by surface barrier detectors. Data analysis involved the TOS source code written by Charles Evans & Associates and owned by General Ionics Corporation.

Based on the RBS data, approximate formulas representing the compositions of each sample surface (to a depth of about 700 Å) and the bulk of each sample were calculated:

| Sample No. EB32-1 | |
|---|---|
| Surface: | $C_{90}O_2Cl_{0.4}S_{0.6}N$ |
| Bulk: | $C_{400}O_2Cl_{0.4}K_{0.3}S_{0.6}$[a] |

[a]The potassium could be either calcium or potassium.

| Sample No. EB38-1 | |
|---|---|
| Surface: | $C_{90}O_3Cl_{0.21}S_{0.8}N$[a] |
| Bulk: | $C_{400}O_3Cl_{0.1}K_{0.2}S_{0.6}$[b] |

[a]The data were insufficient to verify the presence of nitrogen.
[b]The potassium could be either calcium or potassium.

It perhaps should be noted that the reduction of the data presented a number of difficulties. A major problem was the total number of elements of interest in each sample. The computer code was set up to handle five elements per layer. However, the samples had as many as eight elements per layer. Consequently, some elements had to be omitted from the model which led to poor fits of the theoretical values to the experimental results. A second problem was sample variation, in that a number of incidental elements (such as sodium, magnesium, silicon, calcium or potassium, titanium, and iron) were present in one part of the sample but in another.

Although not quantitatively accurate, the RBS results still are of interest. For example, the presence of air during the first step resulted in a reduced level of chlorine and an increased level of sulfur in the surface portion of the fibers when compared with the chlorine and sulfur levels found generally throughout the fiber. Furthermore, the presence of air seemed to cause an increase in the level of sulfur found in the surface portion of the fibers. Of particular interest is the chlorine to sulfur ratio:

| | Cl/S Ratio | |
|---|---|---|
| Sample No. | Surface | Bulk |
| EB32-1 | 0.67 | 0.67 |
| EB38-1 | 0.26 | 0.17 |

It appears that the chlorosulfonation reaction of the prior art extends throughout the bulk of the fibers since the chlorine to sulfur ratios for the surface and the bulk areas are identical. This assumption, however, is inconsistent with the ESCA data which suggest that chlorination is the predominant reaction. Because of the difficulties noted with respect to the RBS data reduction process, it would seem that the ESCA data may be the more reliable of the two. Whatever the cause, the presumption that extensive internal modification has occurred is consistent with the dyeing studies.

It is equally apparent that the sulfation reaction of the present invention, even though conducted unintentionally, is limited to the outer or surface portion of the fibers. Again, this conclusion is consistent with the dyeing studies.

The proclivity of the chlorosulfonation reaction and/or the chlorination reaction to extend throughout the bulk of the article being treated and the surface specificity of the sulfation reaction of the present invention are further demonstrated by two additional sets of data.

First, fibers from Sample Nos. EB32-1 and EB38-1 were analyzed by differential scanning calorimetry (DSC) using a DuPont Model 1090 Thermal Analyzer with a Model 1091 Disc Memory and a Model 910 Differential Scanning Calorimeter (DuPont Instruments, Wilmington, Del.). The DSC thermogram for fibers from Sample No. EB32-1 showed two endotherms, one at 128.9° C. and the other at 145.4° C., suggesting a phase separation of chlorinated and/or amidosulfonated polypropylene from unreacted polypropylene. The thermogram for fibers from Sample No. EB38-1, however, showed a single endotherm at 154.9° C.

Second, Instron data were collected with samples 32-3 (from Example 2) and 44-3 (from Example 5), using an Instron Model 1122 Universal Testing Instrument (Instron Corporation, Canton, Mass.). In each case, the data were obtained from a single 6 in. by 6 in. (15.2 cm.×15.2 cm.) fabric sample mounted with the fabric machine direction oriented vertically. The following data were obtained:

| Sample No.[a] | Peak Energy (In.-Lb.) | Peak Load (Kg-F) | Peak Elong. (In.) | Break Strain (%) |
|---|---|---|---|---|
| 32-3[b] | 2.5368 | 1.960 | 0.8773 | 29.24 |
| 44-3[c] | 1.5024 | 1.528 | 0.6581 | 21.94 |

[a]The treatment protocols differed only by the presence or absence of air during the first step.
[b]Air was present.
[c]Air was absent (nitrogen was used in place of air).

The data clearly show that, in the absence of air, fiber properties deteriorated significantly. The reason for such deterioration is clear from the RBS and DSC results and the dyeing studies, namely, the chlorosulfonation reaction and/or chlorination reaction which occurs in the absence of air (i.e., the first step reaction involving chlorine and sulfur dioxide in the presence of nitrogen) takes place throughout the bulk of the fiber, thereby affecting the physical properties of the fiber.

Having thus described the invention with particular reference to preferred embodiments, it will be obvious to those having ordinary skill in the art to which the invention pertains that numerous variations and changes can be made without departing from the spirit and scope of the invention as defined by the appended claims. For example, when the shaped polyolefin structure is fibrous, the fibers can be derived from a single polyolefin, such as polypropylene. Alternatively, the fibrous structure can be composed of fibers derived from two or more polyolefins, e.g., polyethylene fibers and polypropylene fibers. If desired, nonpolyolefin fibers of synthetic or natural origin, such as polyesters, polyamides, cotton, and wood pulp, also can be present. Any given fiber can be a polycomponent fiber in, for example, a sheath-core or side-by-side arrangement, with at least one component thereof being a polyolefin as defined herein. The other component(s) can be a different polyolefin or a nonolefinic polymer. Other variations will be apparent to those having ordinary skill in the art.

What is claimed is:

1. A hydrophilic shaped polyolefin structure having a surface modified by the presence of hydrogen sulfato groups at a concentration sufficient to render the structure hydrophilic.

2. The structure of claim 1 in which the polyolefin is polyethylene or polypropylene.

3. The structure of claim 1 in which the concentration of chloro groups therein is sufficiently low so that the hydrophilic nature of the modified surface and the physical properties of the structure are not significantly adversely affected.

4. The structure of claim 3 in which the polyolefin is polyethylene or polypropylene.

5. A hydrophilic shaped polyolefin structure having a surface modified by the presence of ammonium sulfato groups at a concentration sufficient to render the structure hydrophilic.

6. The structure of claim 5 in which the polyolefin is polyethylene or polypropylene.

7. The structure of claim 5 in which the concentration of chloro groups therein is sufficiently low so that the hydrophilic nature of the modified surface and the properties of the structure are not significantly adversely affected.

8. The structure of claim 7 in which the polyolefin is polyethylene or polypropylene.

9. A hydrophilic polyolefin fiber having a surface modified by the presence of hydrogen sulfato groups at a concentration sufficient to render the fiber hydrophilic.

10. The fiber of claim 9 in which the polyolefin is polyethylene or polypropylene.

11. The fiber of claim 10 in which the polyolefin is polypropylene.

12. The fiber of claim 9 in which the concentration of chloro groups therein is sufficiently low so that the hydrophilic nature of the modified surface and the physical properties of the fiber are not significantly adversely affected.

13. The fiber of claim 12 in which the polyolefin is polyethylene or polypropylene.

14. The fiber of claim 13 in which the polyolefin is polypropylene.

15. The fiber of claim 12 in which the ratio of chlorine to sulfur at the fiber surface is less than about 3.

16. The fiber of claim 12 in which chlorine is essentially absent from the central portion of the fiber.

17. A hydrophilic polyolefin fiber having a surface modified by the presence of ammonium sulfato groups at a concentration sufficient to render the fiber hydrophilic.

18. The fiber of claim 17 in which the polyolefin is polyethylene or polypropylene.

19. The fiber of claim 18 in which the polyolefin is polypropylene.

20. The fiber of claim 17 in which the concentration of chloro groups therein is sufficiently low so that the hydrophilic nature of the modified surface and the physical properties of the fiber are not significantly adversely affected.

21. The fiber of claim 20 in which the polyolefin is polyethylene or polypropylene.

22. The fiber of claim 21 in which the polyolefin is polypropylene.

23. The fiber of claim 20 in which the ratio of chlorine to sulfur at the fiber surface is less than about 3.

24. The fiber of claim 20 in which chlorine is essentially absent from the central portion of the fiber.

25. A nonwoven web comprising hydrophilic polyolefin fibers having surfaces modified by the presence of hydrogen sulfato groups at a concentration sufficient to render the fibers hydrophilic.

26. The nonwoven web of claim 25 in which the polyolefin is polyethylene or polypropylene.

27. The nonwoven web of claim 26 in which the polyolefin is polypropylene.

28. The nonwoven web of claim 25 in which the concentration of chloro groups in the fibers is sufficiently low so that the hydrophilic nature of the modified surfaces and the physical properties of the fibers are not significantly adversely affected.

29. The nonwoven web of claim 28 in which the polyolefin is polyethylene or polypropylene.

30. The nonwoven web of claim 29 in which the polyolefin is polypropylene.

31. The nonwoven web of claim 28 in which the ratio of chlorine to sulfur at the fiber surfaces is less than about 3.

32. The nonwoven web of claim 28 in which chlorine is essentially absent from the central portions of the fibers.

33. A nonwoven web comprising hydrophilic polyolefin fibers having surfaces modified by the presence of ammonium sulfato groups at a concentration sufficient to render the fibers hydrophilic.

34. The nonwoven web of claim 33 in which the polyolefin is polyethylene or polypropylene.

35. The nonwoven web of claim 34 in which the polyolefin is polypropylene.

36. The nonwoven web of claim 33 in which the concentration of chloro groups in the fibers is sufficiently low so that the hydrophilic nature of the modified surfaces and the physical properties of the fibers are not significantly adversely affected.

37. The nonwoven web of claim 36 in which the polyolefin is polyethylene or polypropylene.

38. The nonwoven web of claim 37 in which the polyolefin is polypropylene.

39. The nonwoven web of claim 36 in which the ratio of chlorine to sulfur at the fiber surfaces is less than about 3.

40. The nonwoven web of claim 36 in which chlorine is essentially absent from the central portions of the fibers.

41. A method of imparting a hydrophilic character to a surface of a shaped polyolefin structure which comprises contacting the surface with a gaseous mixture comprising chlorine, sulfur dioxide, and oxygen or carbon monoxide or a mixture thereof in the presence of a free radical producing means under conditions sufficient to introduce hydrogen sulfato groups at the structure surface.

42. The method of of claim 41 in which the shaped polyolefin structure is a fiber.

43. The method of claim 41 in which the shaped polyolefin structure is a plurality of fibers as a component of a nonwoven web.

44. The method of claim 42 or 43 in which the chlorine to sulfur dioxide volume ratio is less than about 2.5.

45. The method of claim 44 in which the gaseous mixture contains oxygen.

46. The method of claim 45 in which the gaseous mixture contains air.

47. The method of claim 46 in which the gaseous mixture contains from about 10 to about 30 percent by volume of air.

48. The method of claim 41, 42, or 43 in which the free radical-producing means is ultraviolet radiation.

49. The method of claim 48 in which the polyolefin is polypropylene; the gaseous mixture consists essentially of chlorine, sulfur dioxide, and air; the chlorine to sulfur dioxide volume ratio is at least about 1; the gaseous mixture contains from about 10 to about 30 percent by volume of air; and the structure surface is contacted with the gaseous mixture at atmospheric pressure and ambient temperature for a period of at least about three minutes.

50. A method of imparting a hydrophilic character to a surface of a shaped polyolefin structure which comprises the steps of:
   A. contacting the surface with a gaseous mixture comprising chlorine, sulfur dioxide, and oxygen or carbon monoxide or a mixture thereof in the presence of a free radical-producing means under conditions sufficient to introduce hydrogen sulfato groups at the structure surface; and
   B. converting the hydrogen sulfato groups to ammonium sulfato groups by treating the surface obtained from step A with ammonia or an amine having a sufficiently low $pK_B$ under conditions sufficient to cause such conversion.

51. The method of claim 50 in which the shaped polyolefin structure is a fiber.

52. The method of claim 50 in which the shaped polyolefin structure is a plurality of fibers as a component of a nonwoven web.

53. The method of claim 50, 51, or 52 in which the chlorine to sulfur dioxide volume ratio is less than about 2.5.

54. The method of claim 50, 51, or 52 in which the chlorine to sulfur dioxide volume ratio is less than about 1.0.

55. The method of claim 50, 51, or 52 in which the chlorine to sulfur dioxide volume ratio is less than about 0.4.

56. The method of claim 50, 51, or 52 in which the chlorine to sulfur dioxide volume ratio is less than about 0.1.

57. The method of claim 50, 51, or 52 in which the gaseous mixture contains less than about 80 percent by volume of oxygen or carbon monoxide or a mixture thereof.

58. The method of claim 50, 51, or 52 in which the gaseous mixture contains less than about 50 percent by volume of oxygen or carbon monoxide or a mixture thereof.

59. The method of claim 50, 51, or 52 in which the gaseous mixture contains from about 2 to about 30 percent by volume of oxygen or carbon monoxide or a mixture thereof.

60. The method of claim 59 in which the gaseous mixture contains oxygen.

61. The method of claim 60 in which the gaseous mixture contains air.

62. The method of claim 61 in which the gaseous mixture contains from about 10 to about 30 percent by volume of air.

63. The method of claim 50, 51, or 52 in which the free radical-producing means is ultraviolet radiation.

64. The method of claim 63 in which the polyolefin is polypropylene; the gaseous reaction mixture consists essentially of chlorine, sulfur dioxide, and air; the chlorine to sulfur dioxide volume ratio is less than about 0.1; the gaseous mixture contains from about 10 to about 30 percent by volume of air; step A is carried out at atmospheric pressure and ambient temperature for a period of from about 3 to about 10 minutes; and step B utilizes excess gaseous ammonia at atmospheric pressure and ambient temperatures.

* * * * *